United States Patent
Chien et al.

(10) Patent No.: US 12,225,152 B2
(45) Date of Patent: Feb. 11, 2025

(54) SYSTEM AND METHOD FOR ACHIEVING DISPLAY OF CARPLAY INTERFACE ON DISPLAY SCREENS OF MULTIPLE ELECTRONIC DEVICES INTEGRATED IN MOTOR-DRIVEN TRANSPORTATION MEANS

(71) Applicant: PROLIFIC TECHNOLOGY INC., Taipei (TW)

(72) Inventors: Ting-Ta Chien, Taichung (TW); Hsing-Yun Hsieh, Changhua County (TW); Ren-Yuan Yu, Hsinchu County (TW)

(73) Assignee: PROLIFIC TECHNOLOGY INC., Taipei (TW)

( * ) Notice: Subject to any disclaimer, the term of this patent is extended or adjusted under 35 U.S.C. 154(b) by 418 days.

(21) Appl. No.: 17/704,571

(22) Filed: Mar. 25, 2022

(65) Prior Publication Data

US 2022/0272189 A1   Aug. 25, 2022

(30) Foreign Application Priority Data

Feb. 24, 2021   (TW) .................................. 110106467

(51) Int. Cl.
*H04M 1/724* (2021.01)
*H04M 1/72409* (2021.01)

(52) U.S. Cl.
CPC .............................. *H04M 1/724098* (2022.02)

(58) Field of Classification Search
CPC ......... H04M 1/724098; H04M 1/6075; H04M 1/6083; H04L 29/0854; H04L 67/1051–1095; H04N 21/41422
See application file for complete search history.

(56) References Cited

U.S. PATENT DOCUMENTS

| | | | |
|---|---|---|---|
| 2009/0097505 A1* | 4/2009 | Takahashi | H04L 65/756 370/503 |
| 2016/0371213 A1* | 12/2016 | Voto | G06F 13/4045 |
| 2017/0013311 A1* | 1/2017 | Napier | H04N 21/482 |
| 2017/0127112 A1* | 5/2017 | Hoshihara | B60K 35/00 |

(Continued)

FOREIGN PATENT DOCUMENTS

| | | |
|---|---|---|
| CN | 109151012 A | 1/2019 |
| TW | M592840 U | 4/2020 |

*Primary Examiner* — Angelica Perez
(74) *Attorney, Agent, or Firm* — ANOVA LAW GROUP, PLLC

(57) ABSTRACT

A system for achieving display of CarPlay operation interface on display screens of multiple electronic devices is disclosed. The system comprises a first electronic device and a second electronic device, wherein the first electronic device has functionality of Apple CarPlay because of including an Apple Mfi authentication chip. Particularly, a CarPlay executor comprising a principal execution unit and a plurality of sub-execution units is provided in the first electronic device. As such, after a second mobile electronic device is in communication with a second electronic device that is coupled to the first electronic device, one sub-execution unit is authorized by the Apple Mfi authentication chip so as to let a CarPlay operation interface be shown on a display screen of the second electronic device, thereby achieving display of CarPlay operation interface on display screens of multiple electronic devices.

16 Claims, 4 Drawing Sheets

(56) References Cited

U.S. PATENT DOCUMENTS

2018/0129467 A1* 5/2018 Gage ................... B60N 2/002
2018/0288208 A1* 10/2018 Lee ............... H04M 1/724092
2019/0073840 A1* 3/2019 Voigt .................. H04W 4/024
2020/0128291 A1* 4/2020 Morales ............ H04N 21/8106
2022/0342782 A1* 10/2022 Kim ..................... G06F 21/45

* cited by examiner

SYSTEM AND METHOD FOR ACHIEVING DISPLAY OF CARPLAY INTERFACE ON DISPLAY SCREENS OF MULTIPLE ELECTRONIC DEVICES INTEGRATED IN MOTOR-DRIVEN TRANSPORTATION MEANS

FIELD OF THE INVENTION

The present invention relates to the technology field of Automobile entertainment devices, and more particularly to a system and method for achieving display of CarPlay operation interface on display screens of multiple electronic devices integrated in motor-driven transportation means.

BACKGROUND

With advanced development of mobile communication technologies of 4G and 5G, automobile entertainment device having multi functions of multimedia playing, touchable operation and vehicle navigation has become one of the standard devices integrated in an automobile (car). For facilitating driver be able to use the application programs (apps) installed in his smartphone by operating the automobile entertainment device or display the images, audios and/or videos stored in his smartphone by a display screen of the automobile entertainment device, Google company has proposed a specific system called Android Auto that allows the display screen of the automobile entertainment device to display content from the driver's smartphone. By letting the smartphone be in communication with the automobile entertainment device, Android Auto then takes over the display screen of the automobile entertainment device, and shows an operation interface of Android Auto on the display screen, such that the driver is allowed to use some of apps installed in his smartphone through operating the Android Auto operation interface. Moreover, by operating the Android Auto operation interface, images, audios and/or videos stored in the driver's smartphone can also be displayed by the display screen of the automobile entertainment device. It is known that, Apple Inc. has also proposed a system similar to the Android Auto, called Apple CarPlay.

However, Apple CarPlay is not free. For making an automobile entertainment device be able to provide an Apple CarPlay operation interface for driver, the automobile entertainment device must be integrated with an Apple Mfi authentication chip therein. As such, after an iOS smartphone is in communication with the automobile entertainment device, the iOS smartphone is authorized by the Apple Mfi authentication chip, and the Apple CarPlay takes over a display screen of the automobile entertainment device, so as to show an operation interface of Apple CarPlay on the display screen, such that the driver is allowed to use some of apps installed in his iOS smartphone through operating the Apple CarPlay operation interface. Moreover, by operating the Apple CarPlay operation interface, images, audios and/or videos stored in the driver's iOS smartphone can also be displayed by the display screen of the automobile entertainment device. In other words, if a car is equipped with are two or above automobile entertainment devices, each of the automobile entertainment devices needs to be integrated with an Apple Mfi authentication chip therein, such that each automobile entertainment device can dependently run the Apple CarPlay in case of being in communication with an iOS device (e.g., iOS smartphone).

From above descriptions, it should be understood that, the conventional way of achieving that each automobile entertainment device can independently present an Apple CarPlay operation interface on its the display screen is to let each of the automobile entertainment devices to has an Apple Mfi authentication chip. However, such conventional way obviously shows following shortcomings in practical use:

(1) Implementation of Apple CarPlay in each automobile entertainment device is not free for the manufactures of the automobile entertainment devices and/or the automobiles, and even makes the manufacturing cost of each automobile entertainment device become higher; and (2) In spite of a car is originally equipped with an automobile entertainment device with functionality of Apple CarPlay, an automobile entertainment device or display device that is additionally disposed in the car by the driver still cannot run the Apple CarPlay because of lacking a Apple Mfi authentication chip.

From above descriptions, it is understood that, how to make an additional automobile entertainment device or display device be able to run the Apple CarPlay in case of there being only one Apple Mfi authentication chip integrated in a principal automobile entertainment device of a car has therefore become an important issue. In view of that, inventors of the present application have made great efforts to make inventive research and eventually provided a system and method for achieving display of CarPlay operation interface on display screens of multiple electronic devices integrated in motor-driven transportation means.

SUMMARY OF THE INVENTION

The primary objective of the present invention is to disclose a system for achieving display of CarPlay operation interface on display screens of multiple electronic devices. The system comprises a first electronic device and a second electronic device, wherein the first electronic device includes an Apple Mfi authentication chip, and there is a CarPlay executor comprising a principal execution unit and a plurality of sub-execution units provided in the first electronic device. Therefore, the principal execution unit lets a first CarPlay operation interface be shown on a display screen of the first electronic device in case of a first mobile electronic device being in communication with the first electronic device. In such case, after a second mobile electronic device is in communication with a second electronic device that is coupled to the first electronic device, one sub-execution unit is authorized by the Apple Mfi authentication chip so as to let a second CarPlay operation interface be shown on a display screen of the second electronic device. Briefly speaking, the system of the present invention enables multiple electronic devices to share or use the identical Apple Mfi authentication chip, thereby achieving display of CarPlay operation interface on display screens of multiple electronic devices simultaneously.

In order to achieve the primary objective of the present invention, inventors of the present invention provides an embodiment of the system for achieving display of CarPlay operation interface on display screens of multiple electronic devices, comprising:

a first electronic device, having a first display unit, a first communication unit, a CarPlay executor, and an Apple Mfi authentication chip; and at least one second electronic device, having a second display unit, a second communication unit, and being coupled to the first electronic device through a transmission interface;

wherein the CarPlay executor is authorized by the Apple Mfi authentication chip so as to let a first CarPlay operation interface be shown on a display screen of the first display unit in case of a first mobile electronic device with an iOS operating system being in communication with the first electronic device;

wherein after a second mobile electronic device with an iOS operating system is in communication with the second electronic device, the CarPlay executor being also authorized by the Apple Mfi authentication chip so as to let a second CarPlay operation interface be shown on a display screen of the second display unit.

Moreover, the present invention also provides an embodiment of the method for achieving display of CarPlay operation interface on display screens of multiple electronic devices, comprising following steps:

(1) providing a CarPlay executor in the first electronic device;

(2) in case of first mobile electronic device with an iOS operating system being in communication with the first electronic device, the CarPlay executor being authorized by the Apple Mfi authentication chip so as to let a first CarPlay operation interface be shown on a display screen of the first display unit;

(3) in case of a second mobile electronic device with an iOS operating system being in communication with the second electronic device, the CarPlay executor being also authorized by the Apple Mfi authentication chip so as to let a second CarPlay operation interface be shown on a display screen of the second display unit.

In one embodiment, the forgoing CarPlay executor comprises a principal execution unit and a plurality of sub-execution units, such that the principal execution unit is authorized by the Apple Mfi authentication chip in case of the first mobile electronic device being in communication with the first electronic device so as to let the first CarPlay operation interface be displayed by the first display unit, and one of the plurality of sub-execution units is also authorized by the Apple Mfi authentication chip in case of the second mobile electronic device being in communication with the second electronic device so as to let the second CarPlay operation interface be displayed by the second display unit.

In one embodiment, the forgoing transmission interface comprises a first transmission channel for transmitting authentication data, such that the Apple Mfi authentication chip is able to give an authorization to create a CarPlay connection to the second mobile electronic device through the first transmission channel and the second communication channel; wherein the first transmission channel is selected from a group consisting of wireless transmission channel and wired transmission channel.

In practicable embodiments, the system for achieving display of CarPlay operation interface on display screens of multiple electronic devices is disposed in a motor-driven transportation means that is selected from a group consisting of automobile, bus, tour bus, train, cruise ship, yacht, and airplane.

In one embodiment, the CarPlay executor is implemented in the first electronic device by a form of application program.

In a practicable embodiment, the first electronic device further has a first audio unit, a first input unit, and a first device connecting unit. Moreover, the second electronic device further has a second audio unit, a second input unit, and a second device connecting unit.

In one embodiment, the first mobile electronic device is communicated with the first electronic device through a first communication channel, and second mobile electronic device is in communication with the second electronic device via a second communication channel, wherein the first communication channel and the second communication channel are both selected from a group consisting of wireless transmission channel and wired transmission channel.

In a practicable embodiment, the first mobile electronic device is allowed to be electrically connected to the first device connecting unit, and the second mobile electronic device is also allowed to be electrically connected to the second device connecting unit; wherein the first device connecting unit and the second device connecting unit are both a USB OTG connector.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION

To more clearly describe a system and method for achieving display of CarPlay operation interface on display screens of multiple electronic devices integrated in motor-driven transportation means disclosed by the present invention, embodiments of the present invention will be described in detail with reference to the attached drawings hereinafter.

Figure 1:
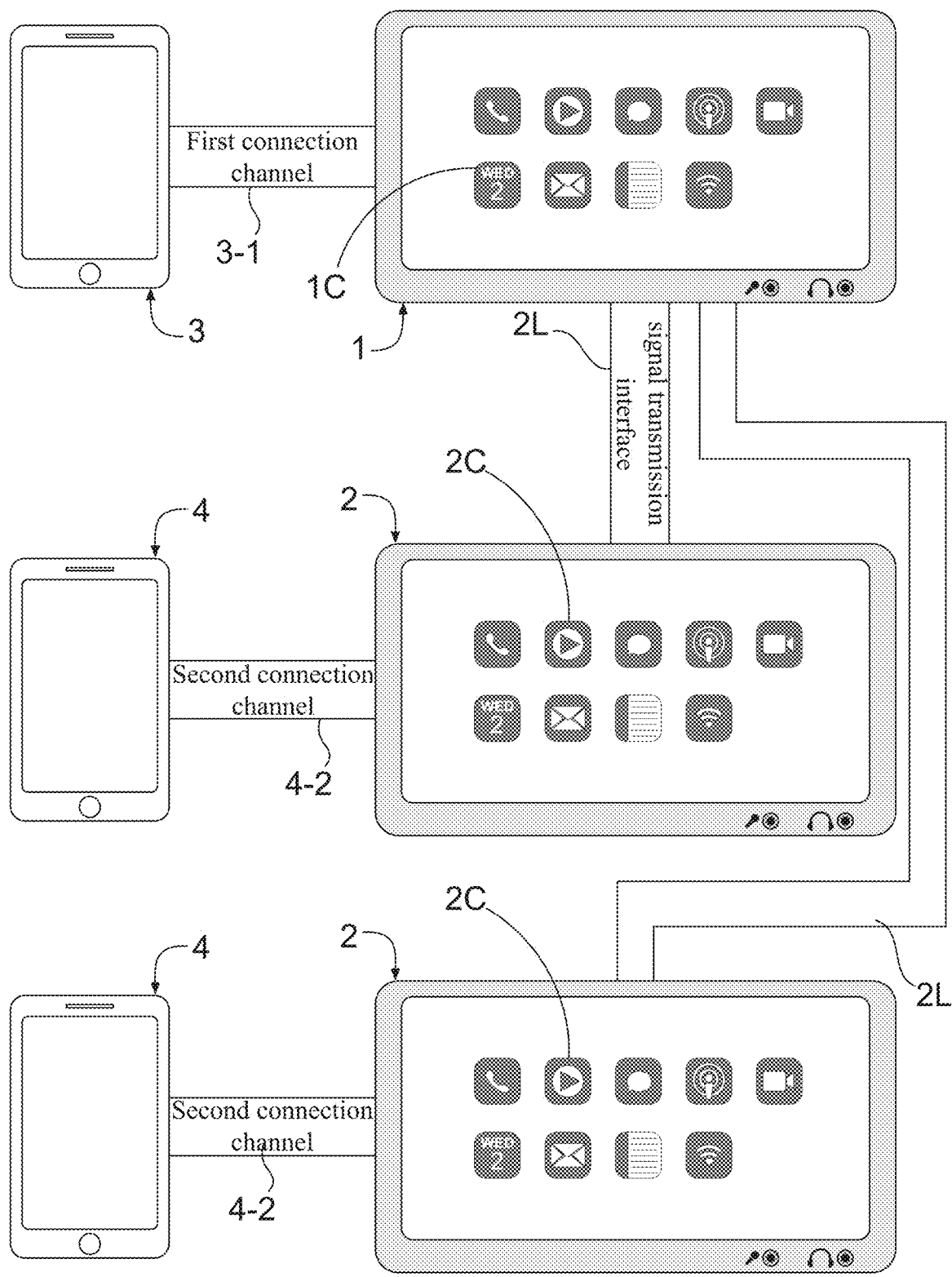
FIG. 1 shows a framework diagram of a system for achieving display of CarPlay operation interface on display screens of multiple electronic devices integrated in motor-driven transportation means according to the present invention.

The present invention discloses a system for application in a motor-driven transportation means so as to achieve display of CarPlay interface on display screens of multiple electronic devices. The motor-driven transportation means can be an automobile, a bus, a tour bus, a train, a cruise ship, a yacht, or an airplane. FIG. 1 shows a block diagram of a system for achieving display of CarPlay interface on display screens of multiple electronic devices according to the present invention. As FIG. 1 shows, the system comprises a first electronic device 1 and at least one second electronic device 2, wherein the second electronic device 2 is coupled to the first electronic device 1 through a transmission interface 2L. In a practicable embodiment, the transmission interface 2L can be an HDMI cable or a USB cable that allows audio and video signals to be transmitted between the two electronic devices.

Figure 2:
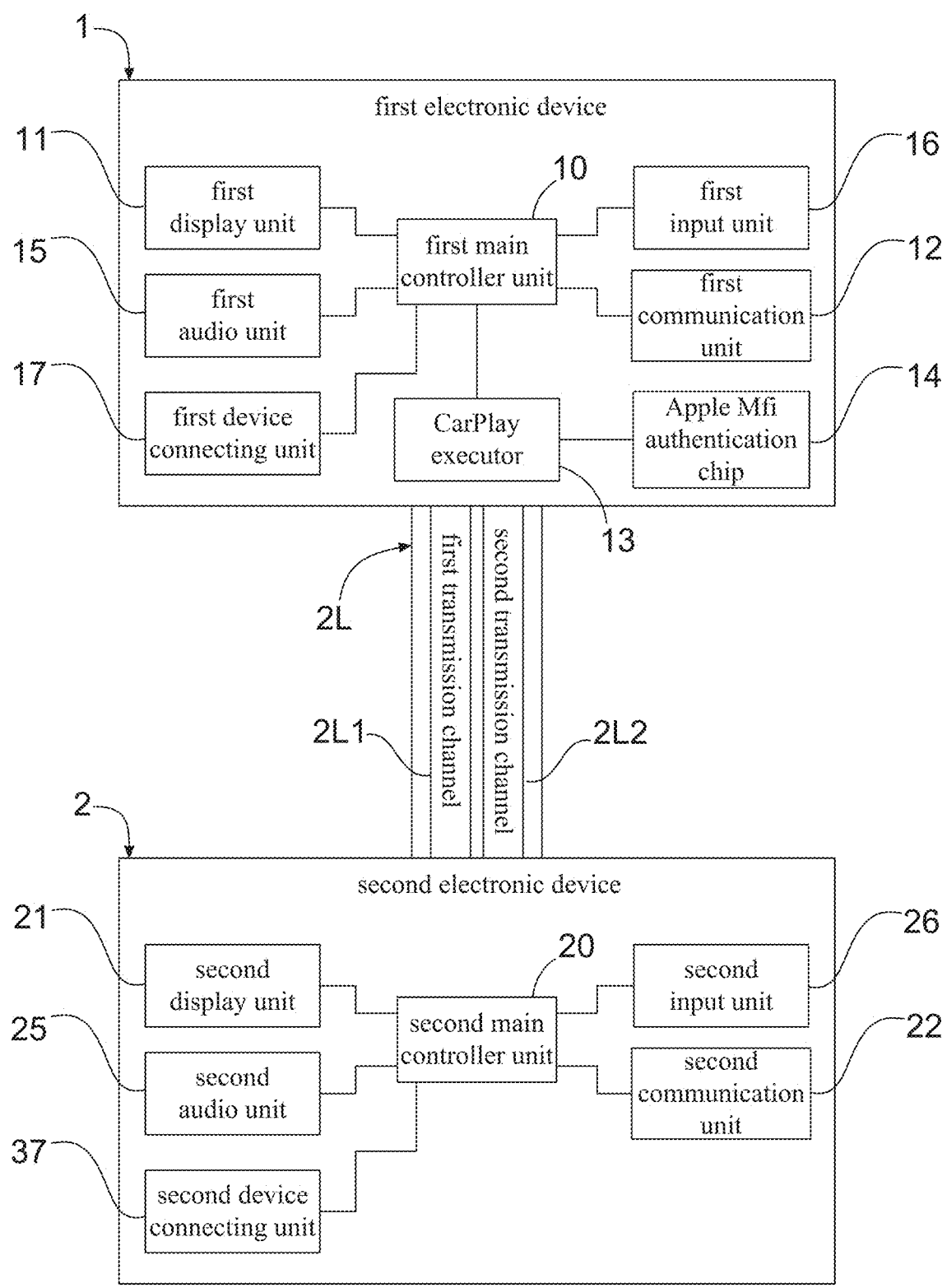
FIG. 2 shows a block diagram of a first electronic device and a second electronic device.

FIG. 2 shows a block diagram of the first electronic device 1 and the second electronic device 2. FIG. 2 depicts that the first electronic device 1 has a first main controller unit 10, a first display screen 11, a first communication unit 12, a CarPlay executor 13, and an Apple Mfi authentication chip 14, and also depicts that the second electronic device 2 has a second main controller unit 20, a second display screen 21, and a second communication unit 22. In other words, the second electronic device 2 is not provided with the CarPlay executor and/or the Apple Mfi authentication chip therein. In one embodiment, the CarPlay executor 13 is implemented in the first electronic device 1 by a form of application program.

Figure 3:
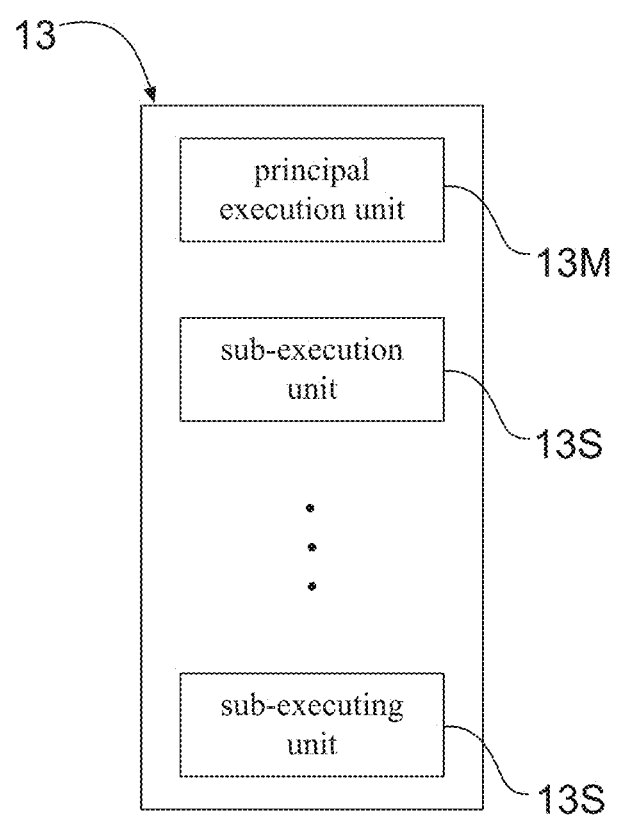
FIG. 3 shows an inner function block diagram of a CarPlay executor that is provided in the first electronic device.

Continuously referring to FIG. 2 and FIG. 3, and please simultaneously refer to FIG. 3 showing a block diagram of the CarPlay executor 13 that is installed in the first electronic device 1. According to the present invention, the CarPlay executor 13 is particularly designed to comprise a principal execution unit 13M and a plurality of sub-execution units 13S. By such arrangement, after a first mobile electronic device 3 with an iOS operating system is communicated with the first electronic device 1 through a first communication channel 3-1, the principal execution unit 13M of the CarPlay executor 13 is enabled to request a CarPlay authentication to the Apple Mfi authentication chip 14. After being authorized by the Apple Mfi authentication chip 14, the principal execution unit 13M lets a first CarPlay operation interface 1C be shown on a display screen of the first display unit 11. As a result, the multimedia data stored in the first mobile electronic device 3 (e.g., driver's smartphone) can be played by the first display unit 11 of the first electronic device 1 by operating the first CarPlay interface 1C. Moreover, some of application programs installed in the driver's smartphone are also shown in the first CarPlay interface 1C (as shown in FIG. 1), such that the driver is allowed to select one of the application programs from the first CarPlay interface 1C to execute.

In such case, if there is a second mobile electronic device 4 with an iOS operating system in communication with one of the at least one second electronic device 2 through a second communication channel 4-2, one of the plurality of sub-execution units 13S of the CarPlay executor 13 is enabled to request a CarPlay authentication to the Apple Mfi authentication chip 14. After being authorized by the Apple Mfi authentication chip 14, the sub-execution units 13S lets a second CarPlay operation interface 2C be shown on a display screen of the second display unit 21. As a result, the multimedia data stored in the second mobile electronic device 4 (e.g., smartphone of a passenger sitting in the car) can be played by the second display unit 21 of the second electronic device 1 by operating the second CarPlay interface 2C. Moreover, some of application programs installed in the passenger's smartphone are also shown in the second CarPlay interface 2C (as shown in FIG. 1), such that the passenger is allowed to select one of the application programs from the second CarPlay interface 2C to execute. Herein, it needs to further explain that, the transmission interface 2L comprises a first transmission channel 2L1 for transmitting authentication data, such that the Apple Mfi authentication chip 14 is able to give an authorization to create a CarPlay connection to the second mobile electronic device 4 through the first transmission channel 2L1 and the second communication channel 4-2. In a practicable embodiment, the first transmission channel 2L1 can be a wireless transmission channel or wired a transmission channel.

For instance, the system consisted of one first electronic device 1 and at least one second electronic device 2 is installed in a car. As explained in more detail below, the first electronic device 1 is an in-car entertainment device disposed on a center console of the car for the driver or a passenger sitting on the front seat to operate. On the other hand, the second electronic device 2 may be another one automobile entertainment device, a display device or a tablet computer that is disposed on a suitable position in the car. In such case, the second electronic device 2 and the first electronic device 1 are allowed to share the single Apple Mfi authentication chip 14, such that both the second electronic device 2 and the first electronic device 1 have a functionality of Apple CarPlay in spite of the fact that there is no Apple Mfi authentication chip 14 provided in the second electronic device 2. As a result, the multimedia data stored in the first mobile electronic device 3 (e.g., the smartphone below to the driver or the man sitting on the front seat) can be played on the first display screen 11 of the first electronic device 1 by operating the first CarPlay interface 1C. Moreover, some of application programs installed in the first mobile electronic device 3 are also shown in the first CarPlay interface 1C (as shown in FIG. 1). In addition, the multimedia data stored in the second mobile electronic device 4 (e.g., smartphone of the man sitting on the back seat) can be played by the second display unit 21 of the second electronic device 2 by operating the second CarPlay interface 2C. Of course, some of application programs installed in the second mobile electronic device 4 are also shown in the second CarPlay interface 2C (as shown in FIG. 1).

Herein, it needs to particularly emphasize that, both the first mobile electronic device 3 and the second mobile electronic device 4 are not limited in their types. In practicable embodiment, the first mobile electronic device 3 and the second mobile electronic device 4 are both a specific electronic device using iOS operating system, such as iPhone, iPad, MAC, and Apple Watch. As described in more detail below, FIG. 1 further depicts that the first mobile electronic device 3 is communicated with the first electronic device 1 through a first communication channel 3-1, and the second mobile electronic device 4 is communicated with the second electronic device 2 through a second communication channel 4-2. In one embodiment, both the first communication channel 3-1 and the second communication channel 4-2 can be a wired transmission channel; for example, a transmission channel provided by an HDMI cable or a USB cable. Moreover, in another one embodiment, both the first communication channel 3-1 and the second communication channel 4-2 can be a wireless transmission channel; for example, a transmission channel provided by Miracast, AirPlay or Google Chromecast.

Furthermore, FIG. 2 also depicts that the first electronic device 1 further has a first audio unit 15, a first input unit 16, and a first device connecting unit 17, and the second electronic device 2 further has a second audio unit 25, a second input unit 26, and a second device connecting unit 27.

Moreover, in a practicable embodiment, the first device connecting unit 17 and the second device connecting unit 27 are both a USB OTG connector. Therefore, the first mobile electronic device 3 can be charged or accessed by the first electronic device 1 after being electrically connected to the first device connecting unit 17. Moreover, the second mobile electronic device 4 can be charged or accessed by the second electronic device 2 after being electrically connected to the second device connecting unit 27.

Figure 4:
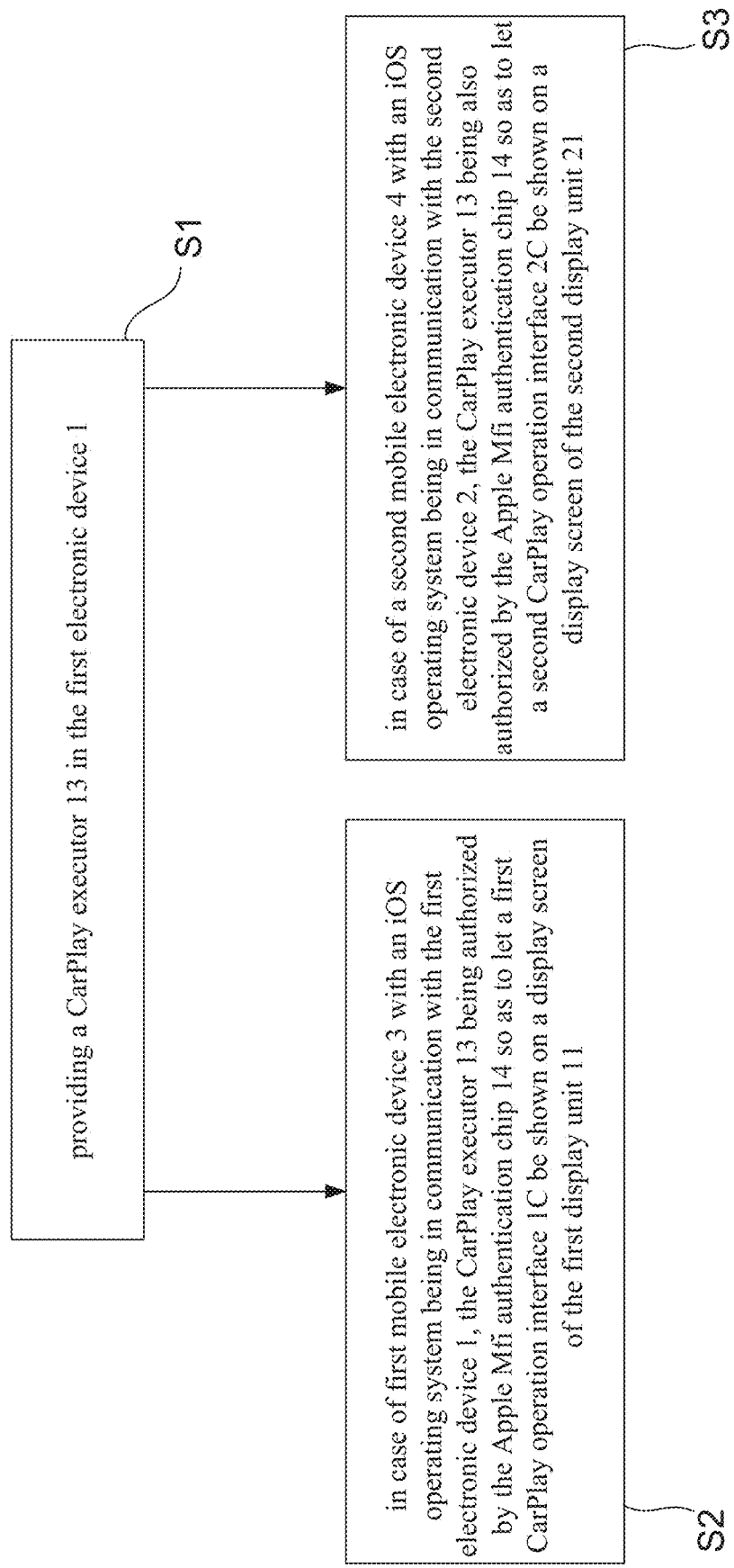
FIG. 4 shows a flowchart diagram of a method for achieving display of CarPlay operation interface on display screens of multiple electronic devices integrated in motor-driven transportation means according to the present invention.

Continuously referring to FIG. 1, FIG. 2 and FIG. 3, and please simultaneously refer to FIG. 4 which illustrates a flowchart diagram of a method for achieving display of CarPlay interface on display screens of multiple electronic devices according to the present invention. The present invention further discloses a method carried out by a system that is consisted of a first electronic device 1 and at least one second electronic device 2, so as to achieve display of CarPlay interface on display screens of multiple electronic devices. As FIG. 4 shows, the method comprises following steps:

(1) providing a CarPlay executor 13 in the first electronic device 1, wherein the CarPlay executor 13 comprises a principal execution unit 13M and a plurality of sub-execution units 13S;

(2) in case of first mobile electronic device 3 installed with an iOS operating system being communicated with the first electronic device 1, enabling the principal execution unit 13M of the CarPlay executor 13 to conduct a CarPlay authentication request to the Apple Mfi authentication chip 14, so as to show a first CarPlay interface 1C on the first display screen 11 of the first electronic device 1; and (3) in case of a second mobile electronic device 4 installed with an iOS operating system being communicated with one of the at least one second electronic device 2, enabling one of the plurality of sub-execution units 13S of the CarPlay executor 13 to conduct the CarPlay authentication request to the Apple Mfi authentication chip 14, so as to show a second CarPlay interface 2C on the second display screen 21 of the second electronic device 2.

Therefore, through above descriptions, all embodiments and their constituting elements of the system for achieving display of CarPlay interface on display screens of multiple electronic devices proposed by the present invention have been introduced completely and clearly; in summary, the present invention includes the advantages of:

(1) The present invention discloses a system for achieving display of CarPlay operation interface on display screens of multiple electronic devices. The system comprises a first electronic device 1 and a second electronic device 2, wherein the first electronic device 1 includes an Apple Mfi authentication chip 14, and there is a CarPlay executor 13 comprising a principal execution unit 13M and a plurality of sub-execution units 13S provided in the first electronic device 1. Therefore, the principal execution unit 13M lets a first CarPlay operation interface 1C be shown on a display screen of the first electronic device 1 in case of a first mobile electronic device 3 being in communication with the first electronic device 1. In such case, after a second mobile electronic device 4 is communicated with a second electronic device 2 that is coupled to the first electronic device 1, one sub-execution unit 13S is authorized by the Apple Mfi authentication chip 14 so as to let a second CarPlay operation interface 2C be shown on a display screen of the second electronic device 2. Briefly speaking, the system of the present invention enables multiple electronic devices to share or use the identical Apple Mfi authentication chip, thereby achieving display of CarPlay operation interface on display screens of multiple electronic devices simultaneously.

The above description is made on embodiments of the present invention. However, the embodiments are not intended to limit scope of the present invention, and all equivalent implementations or alterations within the spirit of the present invention still fall within the scope of the present invention.

What is claimed is:

1. A system for achieving display of CarPlay operation interface on display screens of multiple electronic devices, comprising:
a first electronic device, having a first display unit, a CarPlay executor and an Apple Mfi authentication chip, wherein the CarPlay executor is implemented in the first electronic device by a form of application program that comprises a principal execution function module and a plurality of sub-execution function module;
at least one second electronic device, having a second display unit; and
an authentication data transmission interface connected between the first electronic device and the second electronic device;
wherein the first electronic device is configured to:
execute the principal execution function module, in case of a first mobile electronic device with an iOS operating system being in communication with the first electronic device via a first communication channel, so as to conduct an Apple Mfi authentication of the first mobile electronic device by the Apple Mfi authentication chip;
continuously execute the principal execution function module, in case of the first mobile electronic device passing the Apple Mf authentication, thereby showing a first CarPlay operation interface by the first display unit;
execute one of the sub-execution function modules, in case of second mobile electronic device also installed with the iOS operating system being in communication with the second electronic device via a second communication channel, so as to conduct an authentication data transmission between the second mobile electronic device and the first electronic device through the authentication data transmission interface, thereby conducting the Apple Mfi authentication of the second mobile electronic device by the Apple Mfi authentication chip;
continuously execute the sub-execution function module, in case of the second mobile electronic device passing the Apple Mfi authentication, thereby controlling the second display unit of the second electronic device to show a second CarPlay operation interface.

2. The system of claim 1, wherein the system is disposed in a motor-driven transportation means that is selected from a group consisting of automobile, bus, tour bus, train, cruise ship, yacht, and airplane.

3. The system of claim 1, wherein the first mobile electronic device and the second mobile electronic device are both selected from a group consisting of smartphone, smart watch, tablet computer, and laptop computer.

4. The system of claim 1, wherein the first electronic device further has a first audio unit, a first input unit and a first device connecting unit.

5. The system of claim 4, wherein the second electronic device further has a second audio unit, a second input unit, and a second device connecting unit.

6. The system of claim 5, wherein the second communication channel is selected from a group consisting of wireless transmission channel and wired transmission channel.

7. The system of claim 4, wherein the first first communication channel is selected from a group consisting of wireless transmission channel and wired transmission channel.

8. The system of claim 5, wherein the first mobile electronic device is allowed to be electrically connected to the first device connecting unit, and the second mobile electronic device being also allowed to be electrically connected to the second device connecting unit; wherein the first device connecting unit and the second device connecting unit are both a USB OTG connector.

9. A method for achieving display of CarPlay interface on display screens of multiple electronic devices, being carried out by a system consisting of a first electronic device and at least one second electronic device, wherein the first electronic device has a first display screen, a first communication unit, and an Apple Mfi authentication chip, and the second electronic device has a second display screen and a second communication unit; wherein the method comprises:

providing a CarPlay executor comprising a principal execution function module and a plurality of sub-execution function module in the first electronic device;

making the second electronic device be in communication with the first electronic device through an authentication data transmission interface;

in case of a first mobile electronic device with an iOS operating system being in communication with the first electronic device via a first communication channel, configuring the first electronic device to execute the principal execution function module, the by conducting an Apple Mfi authentication of the first mobile electronic device by the Apple Mfi authentication chip;

in case of the first mobile electronic device passing the Apple Mfi authentication, configuring the first electronic device to continuously execute the principal execution function module, thereby showing a first CarPlay operation interface by the first display unit;

in case of a second mobile electronic device with an iOS operating system being in communication with the second electronic device via a second communication channel configuring the first electronic device to execute one of the sub-execution function modules, so as to conduct an authentication data transmission between the second mobile electronic device and the first electronic device through the authentication data transmission interface, thereby conducting an Apple Mfi authentication of the second mobile electronic device by the Apple Mfi authentication chip;

in case of the second mobile electronic device passing the Apple Mfi authentication, configuring the first electronic device to continuously execute the sub-execution function module, thereby controlling the second display unit of the second electronic device to show a second CarPlay operation interface.

10. The method of claim 9, wherein the system is disposed in a motor-driven transportation means that is selected from a group consisting of automobile, bus, tour bus, train, cruise ship, yacht, and airplane.

11. The method of claim 9, wherein the first mobile electronic device and the second mobile electronic device are both selected from a group consisting of smartphone, smart watch, tablet computer, and laptop computer.

12. The method of claim 9, wherein the first electronic device further has a first audio unit, a first input unit; and a first device connecting unit.

13. The method of claim 12, wherein the second electronic device further has a second audio unit, a second input unit and a second device connecting unit.

14. The method of claim 13, wherein the second communication channel is selected from a group consisting of wireless transmission channel and wired transmission channel.

15. The method of claim 12, wherein the first communication channel is selected from a group consisting of wireless transmission channel and wired transmission channel.

16. The method of claim 13, wherein the first mobile electronic device is allowed to be electrically connected to the first device connecting unit, and the second mobile electronic device being also allowed to be electrically connected to the second device connecting unit; wherein the first device connecting unit and the second device connecting unit are both a USB OTG connector.

* * * * *